United States Patent [19]
Lipsky

[11] Patent Number: 5,331,453
[45] Date of Patent: Jul. 19, 1994

[54] MILLIMETER WAVE FIBER-OPTICALLY LINKED ANTENNA RECEIVER DEVICE

[75] Inventor: Stephen E. Lipsky, Rydal, Pa.

[73] Assignee: AEL Defense Corp., Lansdale, Pa.

[21] Appl. No.: 898,256

[22] Filed: Jun. 15, 1992

[51] Int. Cl.⁵ .............................................. H04B 10/06
[52] U.S. Cl. ..................................... 359/191; 343/895; 343/792.5
[58] Field of Search ............... 343/895, 792.5; 342/53, 342/54, 365, 366; 359/145, 190–192

[56] References Cited

U.S. PATENT DOCUMENTS

| | | | |
|---|---|---|---|
| 3,735,409 | 5/1973 | Gershberg | 343/895 |
| 3,845,293 | 10/1974 | Borner | 250/199 |
| 3,866,177 | 2/1975 | Kawamata et al. | 340/117 R |
| 4,156,810 | 5/1979 | Igarashi | 250/199 |
| 4,169,226 | 9/1979 | Fukuji | 250/199 |
| 4,187,421 | 2/1980 | Key et al. | 250/199 |
| 4,259,746 | 3/1981 | Sandstedt | 455/600 |
| 4,319,248 | 3/1982 | Flam | 343/701 |
| 4,491,977 | 1/1985 | Paul | 455/327 |
| 4,573,212 | 2/1986 | Lipsky | 455/282 |
| 4,742,573 | 5/1988 | Popovic | 359/171 |
| 4,891,694 | 1/1990 | Way | 358/86 |
| 4,928,317 | 5/1990 | Franchini | 359/145 |
| 4,975,926 | 12/1990 | Knapp | 359/172 |

OTHER PUBLICATIONS

Kaiser, J. A., "The Archimedean Two-Wire Spiral Antenna", *IRE Transactions* AP-8, May 1960, pp. 312 ff.

Lipsky, Stephen E., "Antenna Elements For Microwave Passive Direction Finding," *Microwave Passive Direction Finding*, 1987.

Lipsky et al., "Fiber-Optic Methods For Injection-Locked Oscillators," *Microwave Journal*, Jan. 1992.

*Primary Examiner*—Leslie Pascal
*Attorney, Agent, or Firm*—Seidel, Gonda, Lavorgna & Monaco

[57] ABSTRACT

An antenna/receiver device including a slow-wave antenna for receiving RF signals. The antenna has a pair of terminals for providing odd-mode antenna excitation of the antenna. A differential-input circuit is connected to the antenna terminals for providing odd-mode, antiphase current excitation of the terminals and for amplifying the RF signals. A processing circuit is provided for operating on the RF signals and generating an output signal from the RF signals. An optical transducer optically couples the output signal out of the antenna/receiver device. In one embodiment of the invention, the processing circuit comprises a mixing circuit means for mixing the RF signals with a local oscillator signal for generating an intermediate frequency output signal. In an alternate embodiment of the invention, the processing circuit comprises a detector for detecting video information contained in the RF signals.

40 Claims, 3 Drawing Sheets

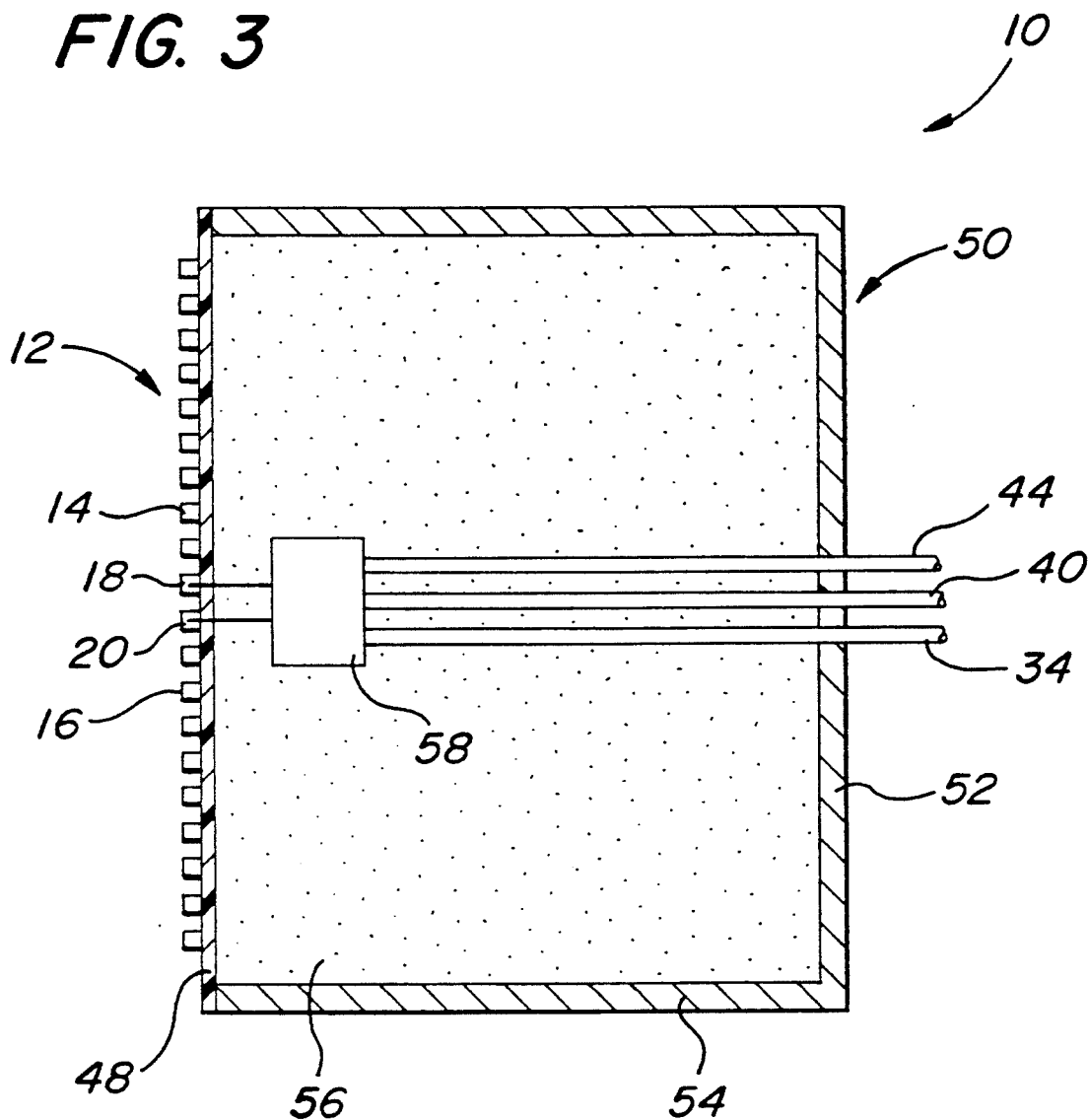

MILLIMETER WAVE FIBER-OPTICALLY LINKED ANTENNA RECEIVER DEVICE

FIELD OF THE INVENTION

The present invention relates to an antenna/receiver combination in which a broad bandwidth slow-wave antenna and an optically-linked downconverter circuit form a compact, wideband antenna/receiver which requires no metallic conductors to conduct signals or power to and from the device.

BACKGROUND OF THE INVENTION

In recent years, there has been an intense interest in receiving signals in the millimeter-wave region of the electromagnetic spectrum, roughly designated as the frequency band from 18 GHz to 100 GHz. There is a need for a receiver that can be readily coupled to an antenna to minimize losses in the interconnection between the antenna and the receiver, in order to obtain maximum sensitivity. The receiver and antenna combination is often used as one channel of an n-channel direction finding (DF) system in which a plurality of the receiver/antennas are disposed at different locations around a host platform, such as an aircraft, for example, so that it is possible to form a monopulse ratio between the signals received at two adjacent antennas to thus provide DF information. Such techniques are known to those skilled in the art, and are described in detail in my book, Microwave Passive Direction Finding, published by John Wiley & Sons, New York, 1987.

Antenna sensor systems that are required to provide monopulse DF are dispersed around the host platform essentially to envelop it in order to eliminate ground effects, and to obtain an optimum field of view. In the past, dispersed antenna and crystal video detector receivers have provided amplitude or phase monopulse DF data by comparing the amplitude or phase of signals from two or more adjacent antennas which are physically separated. The most common configuration is a four antenna system using spiral antennas equally squinted or pointed in each of four quadrants. A video detector and logarithmic video amplifier recovers the amplitudes of the strongest adjacent signals, and forms the monopulse ratio of the two by video logarithmic subtraction, thus yielding a line-of-beating of the intercept. Phase monopulse methods utilize the path length or time-difference-of-arrival of a signal, as intercepted by two or more antennas, as a phase angle from which the same DF data may be obtained.

One type of antenna receiver device suited to DF applications is described in my U.S. Pat. No. 4,573,212, assigned to the same assignee as the present application. In the device described in my earlier patent, a mixer diode is connected across the two output terminals of a two-element spiral antenna. An oscillator signal and dc bias are applied to the mixer diode by direct and capacitive coupling. The non-linear properties of the mixer diode multiply the oscillator signal and an incoming RF signal received by the antenna, resulting in an intermediate frequency signal which is the product of the oscillator signal and the received RF signal. The intermediate frequency signal is recovered at the outer extremities of the spiral antenna for signal processing.

While effective for DF and other applications, the antenna receiver device disclosed in U.S. Pat. No. 4,573,212 does have certain limitations. As with slow-wave antennas in general, the spiral antenna disclosed in U.S. Pat. 4,573,212 will exhibit either odd or even mode behavior depending on whether the signal currents at the feed terminals of the spiral elements are in anti-phase or in-phase relationship, respectively. Each mode exhibits different antenna radiation characteristics. In the first or odd mode, the radiation is perpendicular to the plane of the spiral and has a single peak along the principal or boresight axis. In the normal or even mode, however, there is a null along the principal or boresight axis. For this reason, it is usually preferred to use the first type of antenna/receiver device in the odd mode, which requires that a balun or other coupling, which attains or excites the anti-phase relationship of the signals at the antenna input terminals, be used to couple the antenna output terminals to detecting and processing circuitry. Use of a balun in the antenna described in U.S. Pat. No. 4,573,212 would increase its complexity, especially at millimeter-wave frequencies, and could contribute to signal attenuation and degradation of the performance of the device.

The device disclosed in U.S. Pat. No. 4,573,212 makes use of an oscillator to provide the signal to mix with the inputs from the antennas. In more recent technology, this oscillator is usually included as part of each of the individual antenna/receiver assemblies, which are dispersed about the aircraft. As a result, each of these assemblies may encounter extremes of vibration, shock and temperature, which may be different at each location, causing an error in the DF measurement since amplitudes or phases are compared for DF determination, as described above.

It is also often essential to measure the frequency of an input signal, which can be done by knowing the local oscillator frequency and measuring the downconverted signal at the intermediate frequency that is coupled from the outer extremities of the antenna. The aforementioned environmental conditions can cause sufficient frequency modulation of an unstabilized self-contained oscillator, in the dispersed antenna/receiver units, to render this frequency measurement useless. To overcome this difficulty, injection or phase locking of the self-contained local oscillator is required. This may be accomplished by transporting a stable reference or pilot signal from a benign location to each of the "n" antennas/receivers for this purpose. Since the stable signal must be conveyed some distance, it often undergoes attenuation when carried by standard coaxial cable, and may pick up undesirable interference. This renders the device susceptible to electromagnetic interference and jamming. This is because interfering signals lie in the same frequency range as the local oscillator, received signals, and IF signals, and despite the use of metallic semi-rigid conductor coaxial cables and other methods of conveyance of these frequencies, the IF signals may be interfered with, due to coupling and pickup effects.

It is often advantageous, also, to recover video information contained in modulated RF signals. Instead of mixing the RF signals to obtain a downconverted IF signal, as in U.S. Pat. No. 4,573,212, the RF signal may be applied to a detector whose output is a video signal representative of the video information.

It is an object of the present invention to provide an antenna/receiver which overcomes the drawbacks of prior antenna/receivers mentioned above, and which does so in an elegant, inexpensive and easy-to-implement fashion.

It is a further object of the present invention to provide a novel and improved apparatus and method using fiber-optic technology to accomplish the objective of distributing signals with minimum loss and interference susceptibility.

SUMMARY OF THE INVENTION

In its broad aspects, the present invention is an antenna/receiver device comprising a slow-wave antenna for receiving RF signals, said antenna having a pair of terminals for providing odd-mode antenna excitation of the antenna, differential-input circuit means connected to said antenna terminals for providing odd-mode, antiphase current excitation of said terminals and for amplifying said RF signals, processing circuit means for operating on said RF signals and generating an output signal from said RF signals, and means for optically coupling said output signal out of said antenna/receiver device. In one embodiment of the invention, the processing circuit means comprises mixing circuit means for mixing said RF signals with a local oscillator signal for generating an intermediate frequency output signal. In an alternate embodiment of the invention, the processing circuit means comprises detector means for detecting video information contained in said RF signals.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a simplified sectional view of an antenna receiver device, showing a presently preferred physical embodiment of the invention.

DESCRIPTION OF THE INVENTION

Figure 1:
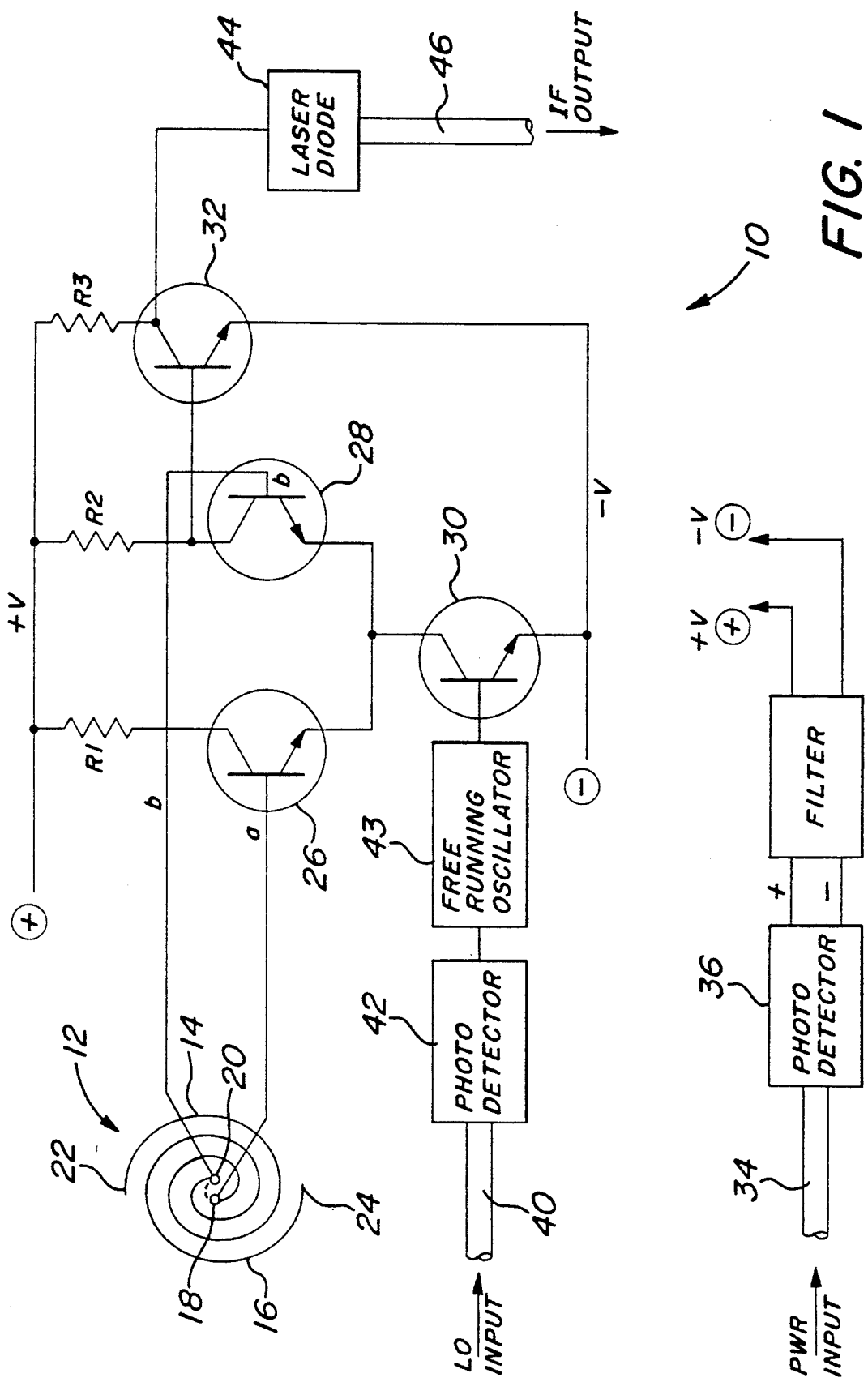
FIG. 1 is a simplified electrical schematic diagram of one embodiment of the present invention.

Referring now to the drawings, wherein like numerals indicate like elements, there is shown in FIG. 1 an antenna/receiver device, generally indicated by reference numeral 10, in accordance with the present invention. Antenna/receiver device 10 comprises a slow-wave antenna 12, illustrated in the figures as an archimedean circular planar spiral antenna, for receiving radio frequency (RF) signals. As used herein, RF refers generally to electromagnetic radiation in the millimeter-wave portion of the spectrum. However, the invention is not limited to any specific frequency range. In addition, it should be understood that other forms of slow-wave antennas, such as log-periodic antennas, equiangular and rectangular spirals and non-planar spirals, or non-spiral shapes such as sinuous antennas, fall within the scope of the present invention.

Spiral antenna 12 comprises a pair of interwound spiral elements 14 and 16 of conductive material. Antenna elements 14, 16 have closely spaced inner ends 18 and 20, respectively, and opposite diametrically disposed outer ends 22 and 24, respectively. When antenna 12 is used as a receiving antenna, as with the present invention, inner ends 18 and 20 constitute the input terminals of the antenna. That is, RF energy falling on antenna 12 will excite antenna 12 and generate signals at terminals 18 and 20, as will be further described hereinafter. Antenna elements 14 and 16 may be formed by any suitable process known in the art, such as electrodeposition of conductive material on a nonconductive substrate or by etching of a printed circuit board, for example, or by other processes known to those skilled in the art.

When illuminated by RF energy, antenna 12 will receive signals at a frequency where a spiral antenna goes into the even mode, this occurring at a diameter on the spiral where one arm of the spiral is in phase with the other arm of the spiral due to a change of the odd-mode to the even mode. This is the result of a progression of phase of 180° of one arm with respect to an adjacent arm of the other. The antenna, at the diameter where this occurs, is equal to $\lambda/\pi$, where $\lambda$ is the wavelength of the incoming signal. Antenna elements 14 and 16 at this point constitute an elemental dipole pair which are in phase. The received signals propagate to the antenna input feed points 18 and 20 where they are out of phase in current by 180°, such relationship being the result of travel from the in-phase diameter to the feed point, and being necessary to establish the proper beamwidth and modes of operation. This method of operation is known in the art and described in Kaiser, J. A., "The Archimedean Two-Wire Spiral Antenna", IRE Transactions AP-8, 1946, pp. 620 ff., and in my book Microwave Passive Direction Finding, cited above.

In order to maintain the required 180° phase shift, and also to provide gain at the RF frequencies, terminals 18 and 20 are connected to the differential input terminals of a differential amplifier circuit comprising transistors 26 and 28. Transistors 26 and 28 are fed from transistor 30, the collector of which is connected to the emitters of transistors 26 and 28 and acts as a current source. An output transistor 32 has its base connected to the collector of transistor 28. The intermediate frequency (IF) signal is recovered from the collector of transistor 32.

One unique feature of the present invention is that all power and signal connections to the device are made electro-optically, that is, no metallic conductors are employed to conduct power or signals to and from the device. Thus, power for the device is derived from an optical power input signal conveyed to the device by means of an optical fiber 34. Optical power input signal may be any suitable optical signal, such as visible or infrared light, derived from any suitable light source such as a coherent light source (e.g., a high intensity light source such as a laser or laser diode) or an incoherent light source (e.g., a high-intensity lamp). The optical power input signal is applied to a photocell 36, which generates an electrical output signal in response to the light energy which illuminates it. The electrical output signal from photocell 36 may be passed through a processor and filter 38 to provide filtered +V and −V supply voltages.

In a similar manner, the local oscillator input is a coherent optical signal modulated by the local oscillator pilot frequency or some submultiple of it. This local oscillator pilot input signal which modulates the lightwave carrier is conveyed to device 10 by means of a second optical fiber 40. The pilot modulated optical local oscillator input signal is then applied to a photodetector diode 42, which demodulates the modulated pilot signal that locks the local oscillator output signal to the desired local oscillator frequency. The local oscillator output signal, which synchronizes with the demodulated pilot signal, is applied to the base of transistor current source 30, where it is used for mixing with RF signals derived from antenna 12, as will be described below.

In the inverse manner, the electrical IF output signal recovered by transistor 32 is converted to an optical IF output signal by modulating a laser diode 44. The electrical IF output signal from transistor 32 is applied to the junction of laser diode 44. In response to the applied electrical signal, laser diode 44 generates an optical signal modulated by the IF signal. The modulated optical IF output signal is then conveyed from device 10 to a desired location by a third optical fiber 46.

Operation of the antenna/receiver device of the invention will now be described.

As previously noted, RF energy falling on antenna 12 generates output signals at terminals 18 and 20. The output signals at terminals 18 and 20 are time-varying signals, and oscillate between positive and negative limits. Signals moving positive at terminal 18, connected to the base of transistor 26, will forward-bias transistor 26 and cause the collector of transistor 26 to move from +V to a lower voltage, due to the resulting voltage drop across resistor R1 as transistor 26 is forward biased. At the same time, the signals at terminal 20 will be moving negative (since they are 180° out of phase with the signals at terminal 18). Since terminal 20 is connected to the base of transistor 28, a negative-going signal will reduce the amount of forward bias applied to transistor 28, and the voltage on the collector of transistor 28 will rise toward +V. This is because transistor 30 acts as a constant current source and supplies a constant current to transistors 26 and 28. Any variation of current in either transistor 26 or 28 will cause an out-of-phase variation in transistor 25 or 28, in that order. Thus, the signals at terminals 18 and 20 are 180° out of phase with each other and meet the odd mode requirement for exciting the antenna 12. The output of the differential amplifier formed by transistors 26 and 28 can be sensed at the collector of transistor 30.

The base of transistor 30 is, in turn, driven by a local oscillator (LO) signal derived by photodetector 42 from the optical LO signal received over optical fiber 40. Optical fiber 40 carries an optical carrier signal, typically at a wavelength of 1300 nanometers, and modulated by a pilot carrier at the desired output frequency, typically 24 GHz or some integral subharmonic, which may be used as the local oscillator directly or as a means to injection lock a free running oscillator 43. (The modulation of the optical carrier signal can be accomplished by modulating a laser by a high-frequency source.) The LO signal thus derived causes a periodic variation in the current flowing through transistor 30 and, therefore, through transistors 26 and 28. The result of the variation in current introduces a nonlinearity which makes transistors 26, 28 and 30 act as a mixer with respect to the RF signals received by the antenna 12 and the LO signal developed or detected from the optical fiber 40. The product of the mixed signals is an intermediate frequency (IF) signal, which is recovered at the collector of transistor 32. The electrical IF signal at the collector of transistor 32 is converted by laser diode 44 into an optical IF signal, also typically at a carrier wavelength of 1300 nanometers. Optical fiber 46 conveys the optical IF signal to a benign remote location where the IF signal is recovered and processed for detection, frequency measurement, or formation of a monopulse ratio with another signal from another next strongest adjacent antenna in the DF system. Since the received RF signals thus recovered are in phase, they are interferometric signals that can be used for phase monopulse direction determination, by measurement of their relative phase difference.

Figure 2:
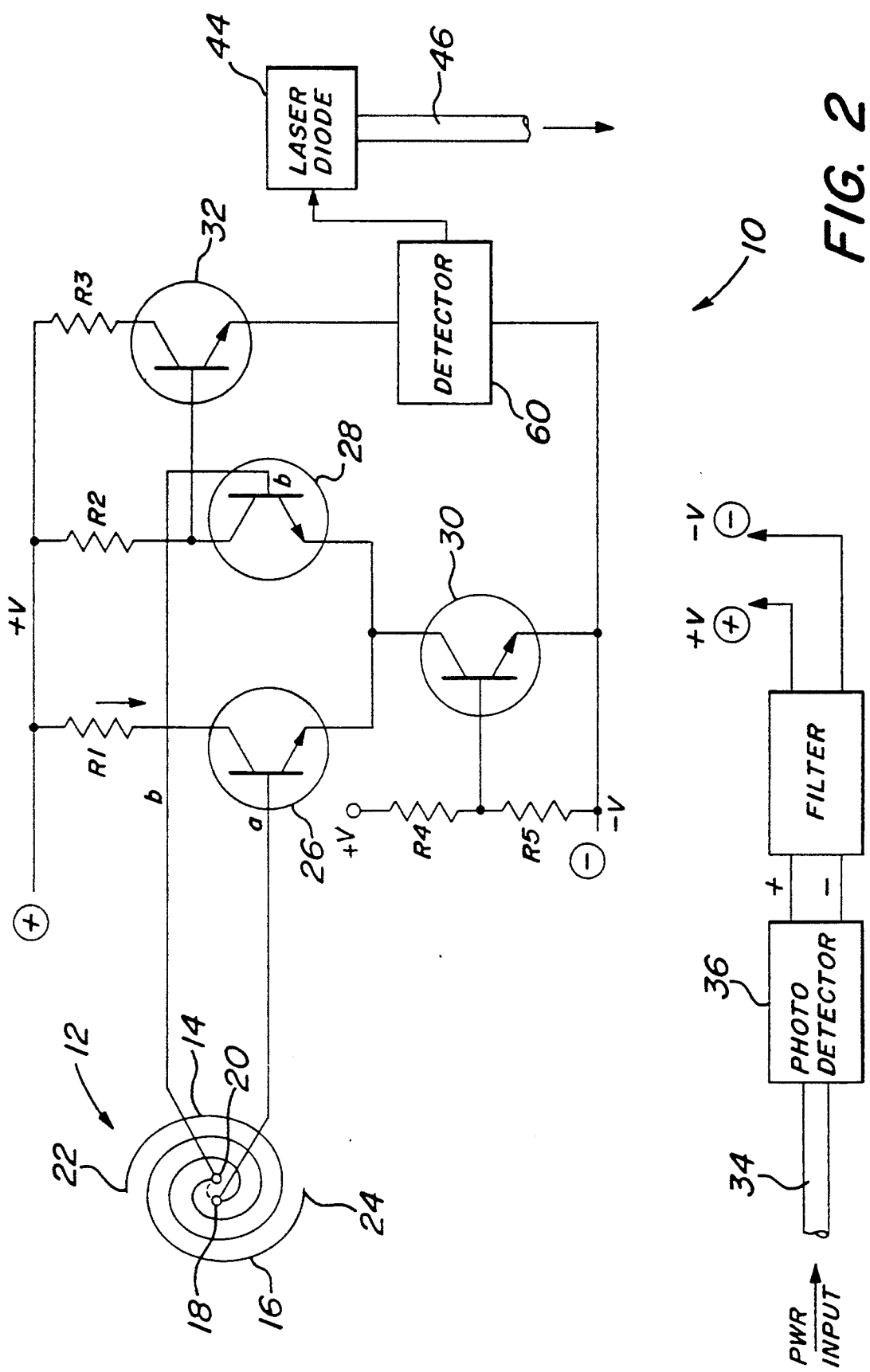
FIG. 2 is a simplified electrical schematic diagram of an alternate embodiment of the present invention.

FIG. 2 illustrates in simplified schematic form an alternate embodiment of the present invention, in which a video detector may be used with the differential amplifier, instead of a mixer, to provide a detected video output signal on optical fiber 46. In the alternate embodiment, transistor 30 is not driven by a local oscillator signal but is instead biased to a fixed operating point by resistors R4 and R5. Transistor 30 acts as a constant current source, but without a periodic variation in the current flowing through it, as in the previous embodiment. Transistors 26, 28 and 30 thus form a conventional differential amplifier. Amplified RF energy, amplified by the differential amplifier, is recovered at the collector of transistor 28 and coupled to transistor 32, which is now connected as an emitter-follower. The emitter output of transistor 30 is applied to a video detector 60, which may, for example, be a detector diode or other suitable detecting device. Detector 60 detects the video information content on the RF signal received by antenna 12. The output from detector 60 is thus a detected video signal, which is applied to laser diode 44. In response to the applied detected video signal, laser diode 44 generates an optical signal modulated by the video signal. The modulated optical video signal is then conveyed from device 10 to a desired location by optical fiber 46.

A physical embodiment of the antenna/receiver device 10 is illustrated in FIG. 3. Preferably, but by no means necessarily, device 10 comprises a cavity-backed spiral antenna 12 mounted on a nonconductive substrate 48 closing one end of a cylindrical housing 50 consisting of an end wall 52 and a cylindrical side wall 54. Housing 50 is conductive. Housing 50 defines an interior cavity, which may be filled with an anechoic material 56 for absorbing the radio frequency energy of the back radiation of the spiral antenna 12. The circuitry illustrated in either FIGS. 1 or 2 is housed in a package 58 mounted in anechoic material 56. Optical fibers 34, 40 and 44 pass through suitable openings in end wall 52 to package 58.

The present invention may be embodied in other specific forms without departing from the spirit or essential attributes thereof and, accordingly, reference should be made to the appended claims, rather than to the foregoing specification, as indicating the scope of the invention.

I claim:

1. An antenna/receiver device, comprising
 (a) a slow-wave antenna for receiving an RF signal, said antenna having a pair of terminals for providing antenna output signals representative of said RF signal, said antenna signals at said terminals being 180° out of current phase with respect to each other,
 (b) differential input circuit means for exciting said antenna terminals with odd mode current phase shift between said antenna output signals and for amplifying said antenna output signals,
 (c) means for optically coupling a local oscillator-modulated lightwave signal to said antenna/receiver device and converting said lightwave signal to an electronic local oscillator signal,
 (d) means for mixing said antenna output signals with said local oscillator signal for generating an intermediate frequency signal, (e) means for converting said intermediate frequency signal to an intermediate frequency-modulated lightwave signal, and (f) means for optically coupling said intermediate frequency-modulated lightwave signal out of said antenna/receiver device.

2. An antenna/receiver device as in claim 1, wherein said antenna is a spiral antenna.

3. An antenna/receiver device as in claim 2, wherein said spiral antenna is a selected one of the group comprising an archimedean spiral antenna, an archimedean circular planar spiral antenna, and an equiangular spiral antenna.

4. An antenna/receiver device as in claim 1, wherein said antenna is a selected one of the group comprising a log-periodic antenna and a sinuous antenna.

5. An antenna/receiver device as in claim 1, wherein said differential input circuit means comprises a differential amplifier.

6. An antenna/receiver device as in claim 1, wherein said means for optically coupling said intermediate frequency output signal out of said device comprises a laser diode.

7. An antenna/receiver device as in claim 1, further comprising an optical fiber for supplying to said device an optical signal from which electrical power for said device is derived and an optical-to-electrical transducer for converting said optical signal to an electrical signal.

8. An antenna/receiver device, comprising
(a) a slow-wave antenna for receiving RF signals, said antenna having a pair of terminals for providing odd-mode excitation of the antenna;
(b) an RF signal processing circuit assembled into an integrated unit with said antenna, said circuit comprising a differential-input circuit connected to said pair of antenna terminals for providing odd-mode, anti-phase current excitation of said terminals and for amplifying said RF signals, said circuit further comprising a processing circuit for operating on said RF signals and generating an output signal from said RF signals; and
(c) exclusively optical signal interfaces to and from said device, said optical signal interfaces comprising means for optically coupling electrical power to the device and means for optically coupling said output signal out of said antenna/receiver device.

9. An antenna/receiver device as in claim 8, wherein said processing circuit comprises a mixing circuit for mixing said RF signals with a local oscillator signal for generating an intermediate frequency output signal.

10. An antenna/receiver device as in claim 9, wherein the exclusively optical signal interfaces further comprise means for optically coupling said local oscillator signal to said device.

11. An antenna/receiver device as in claim 8, wherein said processing circuit comprises a detector for detecting video information contained in said RF signals.

12. An antenna/receiver device as in claim 8, wherein said antenna is a spiral antenna.

13. An antenna/receiver device as in claim 12, wherein said spiral antenna is an archimedean spiral antenna.

14. An antenna/receiver device as in claim 12, wherein said spiral antenna is an archimedean circular planar spiral antenna.

15. An antenna/receiver device as in claim 8, wherein said antenna is a sinuous antenna.

16. An antenna/receiver device as in claim 8, wherein said antenna is an equiangular spiral.

17. An antenna/receiver device as in claim 8, wherein said antenna is a log-periodic antenna.

18. An antenna/receiver device as in claim 8, wherein said differential-input circuit comprises a differential-input RF amplifier.

19. An antenna/receiver device as in claim 8, wherein said means for optically coupling said output signal out of said device comprises an electrical-to-optical transducer.

20. An antenna/receiver device as in claim 19, wherein said transducer comprises a laser diode.

21. An antenna/receiver device as in claim 8, further comprising an optical-to-electrical transducer for converting the optically coupled electrical power signal to an electrical power supply for the device.

22. An antenna/receiver device as in claim 8, wherein
the slow-wave antenna for receiving RF signals is disposed on a nonconductive substrate, said antenna having a pair of signal terminals passing through the substrate;
the antenna and substrate comprising one end of a housing, said housing further comprising conductive side and rear walls and having a cavity within said walls, said cavity being filled with anechoic material for absorbing radio frequency energy;
the RF signal processing circuit is disposed within the housing adjacent the antenna substrate and connected to the antenna signal terminals; and
the optical interfaces of said device pass through a wall of the housing for connection to external equipment.

23. An antenna/receiver device, comprising
(a) a slow-wave antenna for receiving an RF signal, said antenna having a pair of terminals for providing antenna output signals representative of said RF signal, said antenna signals at said antenna input terminals being odd-mode signals 180° out of current phase with respect to each other,
(b) an RF signal processing circuit assembled into an integrated unit with said antenna for receiving RF signals, said circuit comprising a differential-input amplifier circuit connected to said antenna terminals for odd-mode termination of said antenna, said circuit including a mixer for mixing said antenna output signals with a local oscillator signal for generating an intermediate frequency signal, and
(c) exclusively optical signal interfaces to and from said device, said interfaces including means for converting said intermediate frequency signal to a lightwave signal modulated by the intermediate frequency signal, and further including means for optically coupling said modulated lightwave signal out of said antenna/receiver device.

24. An antenna/receiver device as in claim 23, wherein said antenna is a selected one of the group comprising a spiral antenna, an archimedean spiral antenna, an archimedean circular planar spiral antenna, an equiangular spiral antenna, a sinuous antenna, and a log-periodic antenna.

25. An antenna/receiver device as in claim 23, wherein said means for optically coupling said intermediate frequency output signal out of said device comprises a laser diode.

26. An antenna/receiver device as in claim 23, wherein the optical interfaces for the device further comprise means for supplying to said device an optical signal from which electrical power for said device is derived, and an optical-to-electrical transducer for converting said optical signal to an electrical signal.

27. An antenna/receiver device, comprising
   (a) a slow-wave antenna for receiving RF signals, said antenna disposed on a nonconductive substrate and having a pair of terminals for providing odd-mode excitation of the antenna, said pair of terminals passing through the substrate, the antenna and substrate comprising one end of a housing, said housing further comprising conductive side and rear walls and having a cavity within said walls, said cavity being filled with anechoic material for absorbing radio frequency energy;
   (b) an RF signal processing circuit within the housing cavity, said circuit being located adjacent to the antenna substrate and connected to the antenna signal terminals, said circuit including circuitry for providing odd-mode, anti-phase current excitation of said antenna terminals and circuitry for amplifying and mixing said RF signals with a local oscillator signal for generating an intermediate frequency output signal,
   (c) exclusively optical interfaces for signals into and out of the device, said interfaces comprising
      (i) means for optically coupling said local oscillator signal to said circuit means via an optical carrier signal modulated by said local oscillator signal, said means for coupling including means for demodulating said optical carrier signal,
      (ii) means for optically coupling said intermediate frequency output signal out of said antenna/receiver device via an optical carrier signal modulated by said intermediate frequency output signal, said means for coupling including means for modulating said optical carrier signal, and
      (iii) means for coupling to said device an optical signal from which electrical power for said device is derived,
   all of said optical interfaces passing through a wall of the housing for connection to external equipment.

28. An antenna/receiver device, comprising
   (a) a slow-wave antenna for receiving an RF signal, said antenna having a pair of terminals for providing antenna output signals representative of said RF signal, said antenna signals at said terminals being 180° out of current phase with respect to each other,
   (b) an RF signal processing circuit assembled into an integrated unit with said antenna, said circuit comprising a differential input circuit for exciting said antenna terminals with odd mode current phase shift between said antenna output signals and for amplifying said antenna output signals, said circuit further comprising a detector for detecting video information contained in said RF signals and generating a video output signal; and
   (c) exclusively optical interfaces for coupling signals into and out of the device, said interfaces including means for optically coupling said video output signal out of said antenna/receiver device.

29. An antenna/receiver device as in claim 28, wherein said antenna is a spiral antenna.

30. An antenna/receiver device as in claim 29, wherein said spiral antenna is a selected one of the group comprising an archimedean spiral antenna, an archimedean circular planar spiral antenna, and an equiangular spiral antenna.

31. An antenna/receiver device as in claim 29, wherein
   the slow-wave antenna for receiving RF signals is disposed on a nonconductive substrate, said antenna having a pair of signal terminals passing through the substrate;
   the antenna and substrate comprise one end of a housing, said housing further comprising conductive side and rear walls and having a cavity within said walls, said cavity being filled with anechoic material for absorbing radio frequency energy;
   the RF signal processing circuit is disposed within the housing cavity, adjacent the antenna substrate and connected to the antenna signal terminals; and,
   the optical interfaces of said device pass through a wall of the housing for connection to external equipment.

32. An antenna/receiver device as in claim 28, wherein said antenna is a selected one of the group comprising a log-periodic antenna and a sinuous antenna.

33. An antenna/receiver device as in claim 28, wherein said differential input circuit means comprises a differential-input RF amplifier.

34. An antenna/receiver device as in claim 28, wherein said means for optically coupling said video output signal out of said device comprises a laser diode.

35. An antenna/receiver device as in claim 28, said optical interfaces further comprising an optical fiber for supplying to said device an optical signal from which electrical power for said device is derived and an optical-to-electrical transducer for converting said optical signal to an electrical signal.

36. An antenna/receiver device, comprising
   (a) a slow-wave antenna for receiving an RF signal, said antenna having a pair of terminals for providing antenna output signals representative of said RF signal, said antenna signals at said antenna input terminals being odd-mode signals 180° out of current phase with respect to each other,
   (b) an RF signal processing circuit assembled into an integrated unit with said antenna, said circuit comprising a differential amplifier circuit connected to said antenna terminals for odd-mode termination of said antenna, said circuit including a mixer for mixing said antenna output signals with a local oscillator signal for generating an intermediate frequency signal,
   (c) a detector for detecting video information contained in said RF signal and generating a video output signal representative of said video information, and
   (d) exclusively optical interfaces for coupling signals into and out of the device, said optical interfaces including means for optically coupling said video output signal out of said antenna/receiver device.

37. An antenna/receiver device as in claim 36, wherein said antenna is a selected one of the group comprising a spiral antenna, an archimedean spiral antenna, an archimedean circular planar spiral antenna, an equiangular spiral antenna, a sinuous antenna, and a log-periodic antenna.

38. An antenna/receiver device as in claim 36, wherein said means for optically coupling said video output signal out of said device comprises a laser diode.

39. An antenna/receiver device as in claim 36, wherein the optical interfaces further comprise means for supplying to said device an optical signal from which electrical power for said device is derived, and an optical-to-electrical transducer for converting said optical signal to an electrical signal.

40. An antenna/receiver device, comprising
   (a) a slow-wave antenna for receiving RF signals, said antenna having a pair of terminals for providing odd-mode antenna excitation of the antenna,
   (b) circuit means for providing odd-mode, anti-phase current excitation of said antenna terminals, said circuit including means for amplifying and mixing said RF signals with a local oscillator signal for generating an intermediate frequency output signal,
   (c) means for optically coupling said local oscillator signal to said circuit means via an optical carrier signal modulated by said local oscillator signal, said means for coupling including means for demodulating said optical carrier signal,
   (d) means for optically coupling said intermediate frequency output signal out of said antenna/receiver device via an optical carrier signal modulated by said intermediate frequency output signal, said means for coupling including means for modulating said optical carrier signal, and
   (e) means for coupling to said device an optical signal from which electrical power for said device is derived.

* * * * *